March 4, 1924.

H. C. HOLDEN

HYDROGENATION OF OILS

Filed Oct. 9, 1919

1,485,926

H. C. Holden
Inventor

By his Attorneys
Pennie Davis Marvin & Edmonds

Patented Mar. 4, 1924.

1,485,926

UNITED STATES PATENT OFFICE.

HIRAM CHESTER HOLDEN, OF CHICAGO, ILLINOIS, ASSIGNOR TO THE AMERICAN COTTON OIL COMPANY, OF NEW YORK, N. Y., A CORPORATION OF NEW JERSEY.

HYDROGENATION OF OILS.

Application filed October 9, 1919. Serial No. 329,541.

*To all whom it may concern:*

Be it known that I, HIRAM C. HOLDEN, a citizen of the United States, residing at Chicago, in the county of Cook, State of Illinois, have invented certain new and useful Improvements in Hydrogenation of Oils; and I do hereby declare the following to be a full, clear, and exact description of the invention, such as will enable others skilled in the art to which it appertains to make and use the same.

The present invention relates to certain new and useful improvements in the hydrogenation of oils and liquid fats and is based upon the discovery that by introducing the hydrogen in a suitable condition of minute dissemination into the body of oil or liquid fat to be hydrogenated, it will maintain substantially its original condition of distribution throughout the mass, from top to bottom thereof and without producing any objectionable foaming or frothing as the excess leaves the surface of the body undergoing hydrogenation; and that, furthermore, by thus obtaining, throughout the entire mass, an extraordinarily fine and practically uniform distribution of the hydrogen bubbles, they will, by reason of their uniform and lively levitation through the liquid oil or fat, readily maintain in active suspension the finely-divided catalyst employed in the hydrogenating operation, with the result that such an intimate contactual relationship will be established between the oil, catalyst and hydrogen that the speed of the hydrogenation will be greatly accelerated and the quantity of catalyst required may be very materially diminished.

It is a characteristic feature of the invention that mechanical agitation of the liquid oil or fat, in the sense of the employment of beaters, paddles, or the like, (and the accompanying difficulties usually involved in the provision of hydrogen-tight stuffing boxes and the like, for the moving parts) is entirely dispensed with, the levitation of the fine bubbles of hydrogen serving unaided to maintain the catalyst in suspension. In fact, the combined mass of liquid fat or oil, catalyst, and hydrogen particles present substantially a homogeneous body, from top to bottom, wherein the reactions incident to the process proceed with substantial uniformity and with marked advantage over any bubbling operation or mechanical agitation operation known to me in the oil-hydrogenating art.

In the accompanying drawing,—

Similar numerals of reference indicate similar parts.

Figure 1:
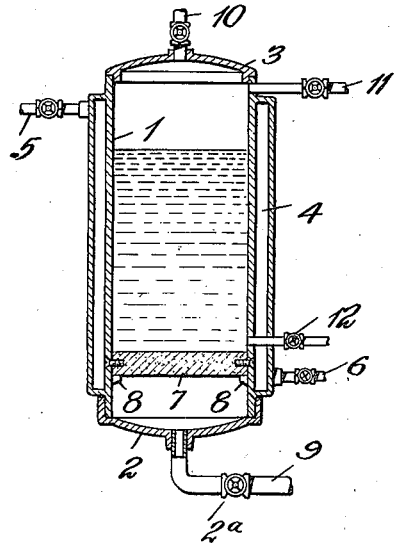
Fig. 1 represents a vertical section and partial elevation of a form of apparatus adapted for the practice of the invention.

Referring first to the hydrogenator shown in Fig. 1, 1 indicates the oil-containing chamber or compartment of the hydrogenator consisting of a cylindrical metal shell or pipe section, fitted at its lower end with a screw cap 2, containing an inlet pipe 9 for the introduction of hydrogen whose supply is regulated by a valve $2^a$. Near the bottom of the chamber 1, but separated from the interior of the cap 2 by an intervening space is located a porous plate 7 about $1\frac{1}{4}$ inches in thickness and firmly secured in position by set screws, or the like, as shown, and cemented around the lower peripheral edge with a gas-proof composition 8 so as to prevent the upward passage of any hydrogen between the periphery of the porous plate 7 and the inner wall of the receptacle 1. The receptacle may be provided with a suitable attemperating jacket 4 through which a heating or a cooling liquid, as the case may be, may be circulated by means of the inlet and outlet pipes 5, 6. A pipe 12 serves to draw off the hydrogenated oil, and the cap 3 is provided for closing the receptacle at the top. The pipe 10 may serve for the carrying off of any excess hydrogen, and the pipe 11 may serve for the admission of the liquid fat or oil and also for the admission of the catalyst (preferably preliminarily mixed with oil) into the apparatus. The several pipes, as indicated, will be supplied with suitable regulable cut-off valves or cocks, and it will, of course, be understood that suitable provision will be made for rendering the joints of the apparatus hydrogen-tight.

In operation, the liquid oil or fat may be heated to the desired temperature, in any suitable manner, as, for instance, by passing a current of steam at the required pressure through the jacket 4; or, the liquid oil or fat may be preliminarily heated to the desired temperature and then poured into the cell or compartment 1. The hydrogen is simultaneously admitted through the pipe 9 and inlet 7, the flow being regulated by the valve 2ª or its equivalent. The catalyst is next added, preferably in the form of finely-divided catalytically active nickel, or its equivalent.

The relationship between the porosity of the porous plate, the static head of the liquid oil or fat, and the pressure of the hydrogen passing through the plate is so established that the hydrogen permeates the entire body of oil or fat distributing itself in an infinitesimal number of exceedingly small bubbles which levitate through the mass of mixed oil and catalyst, proportionately increasing the volume thereof, the excess being liberated at the surface and passing off through the exit pipe, without causing any foaming within the cell. The pressure below the porous plate must be sufficient to eliminate any possibility of oil passing through said plate into the hydrogen chamber. Tests made from time to time by withdrawing a portion of the contents through the tube 12, or otherwise, permit the progress of the hydrogenation to be determined.

These tests show that whereas in the usual type of cell the rate of hydrogenation diminishes markedly as the operation proceeds, in the cell of the present invention the rate remains relatively constant. In some instances, the difference in result is so great that the same degree of hardening of the oil or liquid fat is accomplished in less than one-half the time and with less than one-half the hydrogen, with the employment of the present invention, in the hydrogenation of the same quantity of oil and with the same quantity and quality of catalyst. So also, the increased efficiency of operating in accordance with the present invention was made manifest by diminishing the percentage of catalyst employed, a marked saving both in time and hydrogen being obtained even though the amount of catalyst employed was less than in the customary practice.

Figure 2:
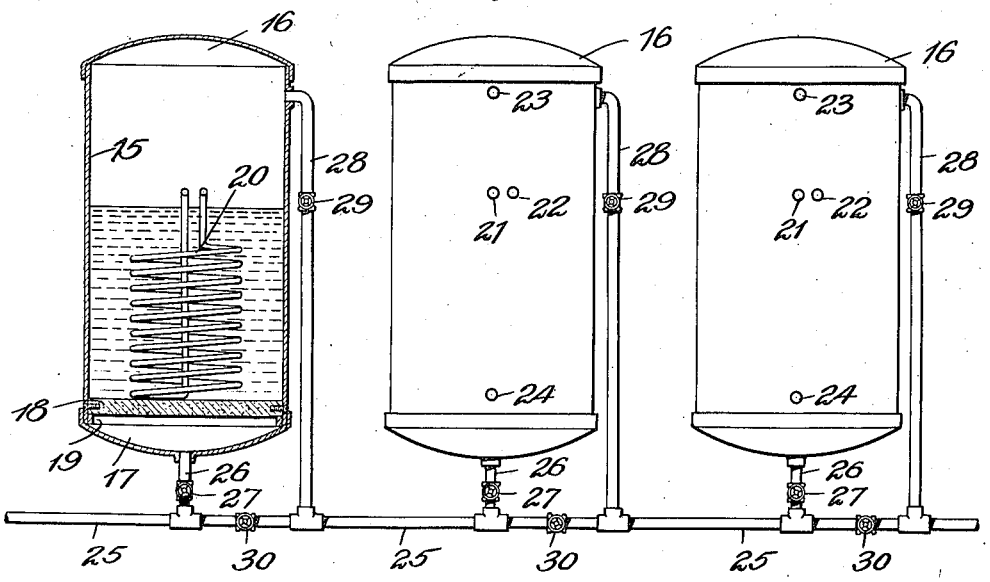
Fig. 2 represents a modification thereof, wherein a series of individual hydrogenators are assembled, so as to more effectually use the supply of hydrogen available.

In Fig. 2, is illustrated the application of the invention to a series of hydrogenators, whose general construction will be recognized as corresponding generally to the form shown in Fig. 1, the attemperating jacket 4 being supplanted by the attemperating coil 20 having an inlet pipe 21 and an exit pipe 22. The hydrogen main 25 is provided with a series of branches 26 and with regulating or cut-off valves 27, 30, whereby the hydrogen may be directed into any one of the series of hydrogenators or, whereby, the excess hydrogen from one member of the series may be directed through the corresponding pipe 28 and valve 29 to the next member thereof; so that, in such case, the excess hydrogen from one member of the series may be entirely utilized instead of conveying it to a collecting gasometer or instead of returning it to the space below its own porous plate. At the left-hand side of Fig. 2, the vertical sectional view of one of the hydrogenators will sufficiently indicate the internal arrangement and construction of the remainder. The shell 15 is closed at its upper and lower ends by the cap pieces 16, 17, respectively, the porous plates 18 are held in place by set screws or the like and 19 indicates the location of the composition of cement for compelling the hydrogen to pass up through the plate instead of working its way through the space between the periphery of the plate and the inner wall of the receptacle. In Fig. 2 the numeral 23 indicates a suitable inlet for the oil and catalyst and the numeral 24 indicates a suitable outlet for the hydrogenated oil and fat.

It will be noted that in the practice of the invention, the porosity of the porous plate is so chosen as to permit it to exercise its function as a uniform distributor of the hydrogen, without being impaired or interfered with by any obstructive filtration of the oil into the substance of the plate and thence into the member below when suitable pressure is maintained in the hydrogenation chamber. The entire arrangement results in the securing of an extremely intimate contact between the oil, the catalyst and the hydrogen, to the great advantage of the hydrogenation operation both with regard to its greater simplicity, the dispensing with moving parts, the reduction of volume of hydrogen necessary to bring about a given degree of hardness of the oil and the reduction in the time necessary for hydrogenating an oil to a given degree of hardness.

I prefer to employ a filtrose plate as the distributing and disseminating element of the hydrogenator. Filtrose is a fine grained, porous tile, substantially mineral in composition. I desire it to be understood, however, that I intend to include within the scope of the invention any equivalent porous septum operating in the same way.

Having thus described my invention, what I claim is:

1. The method of hydrogenating liquid fats and oils, which comprises subjecting them, in the presence of a catalyst, to the hydrogenating influence of an uprising body of fine bubbles of hydrogen rising uniformly from a porous distributing plate, the porosity being such to minutely disseminate the hydrogen without permitting obstructive filtration of the oil into the plate; substantially as described.

2. The method of hydrogenating liquid fats and oils, which comprises subjecting them, in the presence of a catalyst, to the hydrogenating influence of an uprising body of fine bubbles of hydrogen discharged into the oil body through a porous septum, the hydrogen pressure being maintained sufficient substantially to prevent the fats or oils passing through the septum.

3. The method of hydrogenating liquid fats and oils, which comprises subjecting them, in the presence of a catalyst, to the hydrogenating influence of an uprising body of fine bubbles of hydrogen rising uniformly from a porous distributing plate and maintaining the catalyst in suspension in the oil by the levitating action of the hydrogen bubbles; substantially as described.

4. The method of hydrogenating liquid fats and oils, which comprises subjecting them, in the presence of a catalyst and in the absence of mechanical agitation and while supported upon a porous plate, to the hydrogenating influence of a body of hydrogen rising uniformly from said porous plate in a condition of minute dissemination.

5. The method of hydrogenating liquid fats and oils, which comprises subjecting them, in the presence of a catalyst, to the hydrogenating influence of a body of minutely disseminated bubbles of hydrogen discharged unmixed with oil or catalyst into the oil body through a porous septum.

6. A hydrogenator for liquid oleaginous material, comprising a chamber for the reception of the liquid oleaginous material to be hydrogenated, means for admitting a supply of liquid oleaginous material and catalyst thereto, a porous plate upon which the mixture of liquid oleaginous material and catalyst is supported, and means for admitting hydrogen below said porous plate; substantially as described.

7. A hydrogenator for liquid oleaginous material, comprising a chamber for the reception of the liquid oleaginous material to be hydrogenated, means for admitting a supply of liquid oleaginous material and catalyst thereto, means for admitting hydrogen within a compartment in said chamber and means comprising a porous hydrogen disseminating septum to exclude the oleaginous material from said compartment.

In testimony whereof I affix my signature.

HIRAM CHESTER HOLDEN.